United States Patent
Khaled

(10) Patent No.: US 10,480,375 B2
(45) Date of Patent: Nov. 19, 2019

(54) SCR CONVERSION EFFICIENCY DIAGNOSTICS

(71) Applicant: Cummins Emission Solutions, Inc., Columbus, IN (US)

(72) Inventor: Nassim Khaled, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 210 days.

(21) Appl. No.: 15/521,125

(22) PCT Filed: Oct. 28, 2014

(86) PCT No.: PCT/US2014/062568
§ 371 (c)(1),
(2) Date: Apr. 21, 2017

(87) PCT Pub. No.: WO2016/068867
PCT Pub. Date: May 6, 2016

(65) Prior Publication Data
US 2017/0350291 A1 Dec. 7, 2017

(51) Int. Cl.
*F01N 3/20* (2006.01)
*F01N 11/00* (2006.01)
(Continued)

(52) U.S. Cl.
CPC .......... *F01N 3/208* (2013.01); *F01N 3/2066* (2013.01); *F01N 11/00* (2013.01); *F01N 11/007* (2013.01);
(Continued)

(58) Field of Classification Search
CPC ............. F01N 11/007; F01N 2560/021; F01N 2560/026; F01N 2900/0406; F01N 2900/1616; F01N 3/208; G01M 15/102
See application file for complete search history.

(56) References Cited

U.S. PATENT DOCUMENTS 6,168,709 B1   1/2001 Etter
6,622,479 B2   9/2003 Kakuyama et al.
(Continued)

FOREIGN PATENT DOCUMENTS

CN   1363014 A   8/2002
CN   101839162 A   9/2010

OTHER PUBLICATIONS

Fowlie, et al., Scared Cars? Cost-Effective Regulation of Stationary and Nonstationary Pollution Sources, American Economic Journal: Economic Policy 4(1):98-126 (2012), 30 pages.
(Continued)

*Primary Examiner* — Audrey K Bradley
*Assistant Examiner* — Anthony Ayala Delgado
(74) *Attorney, Agent, or Firm* — Foley & Lardner LLP

(57) ABSTRACT

A system for determining a performance status of an exhaust aftertreatment system may include determining an ammonia-to-nitrogen ratio using a sample ammonia input value and a sample $NO_x$ input value. An actual $NO_x$ input value and an actual ammonia input value can be received. An emission value from may be received from a first sensor. A $NO_x$ emission estimate, an ammonia slip estimate, and an optimal ammonia storage value for a selective catalytic reduction may be determined using an iterative inefficiency calculation based, at least in part, on the actual $NO_x$ input value, the actual ammonia input value, and the ammonia-to-nitrogen ratio; and the $NO_x$ emission estimate, the ammonia slip estimate, and the optimal ammonia storage value may be outputted to a diagnostic system.

30 Claims, 8 Drawing Sheets

(51) Int. Cl.
*G01M 15/02* (2006.01)
*F01N 13/00* (2010.01)
*G01M 15/10* (2006.01)

(52) U.S. Cl.
CPC ........... *F01N 13/008* (2013.01); *G01M 15/02* (2013.01); *F01N 2550/03* (2013.01); *F01N 2560/021* (2013.01); *F01N 2560/026* (2013.01); *F01N 2610/02* (2013.01); *F01N 2900/0406* (2013.01); *F01N 2900/0408* (2013.01); *F01N 2900/0416* (2013.01); *F01N 2900/1402* (2013.01); *F01N 2900/1616* (2013.01); *F01N 2900/1622* (2013.01); *G01M 15/102* (2013.01); *Y02A 50/2325* (2018.01); *Y02T 10/24* (2013.01); *Y02T 10/47* (2013.01)

(56) References Cited

U.S. PATENT DOCUMENTS

| | | | |
|---|---|---|---|
| 7,186,564 B2 | 3/2007 | Chen et al. | |
| 7,208,078 B2 | 4/2007 | Weissman et al. | |
| 8,010,236 B2 | 8/2011 | Jambhekar et al. | |
| 8,034,329 B2 | 10/2011 | Colter et al. | |
| 8,108,073 B2 | 1/2012 | Jambhekar et al. | |
| 8,137,444 B2 | 3/2012 | Farsad et al. | |
| 8,138,199 B2 | 3/2012 | Noronha et al. | |
| 8,265,854 B2 | 9/2012 | Stewart et al. | |
| 8,360,040 B2 | 1/2013 | Stewart et al. | |
| 8,367,815 B2 | 2/2013 | Smolke et al. | |
| RE44,452 E | 8/2013 | Stewart et al. | |
| 8,504,175 B2 | 8/2013 | Pekar et al. | |
| 8,606,553 B2 | 12/2013 | Palsson | |
| 8,620,461 B2 | 12/2013 | Kihas | |
| 8,635,031 B2 | 1/2014 | Palsson | |
| 9,181,835 B2 * | 11/2015 | Aliyev | F01N 3/208 |
| 9,657,630 B2 | 5/2017 | Perrin et al. | |
| 2009/0205325 A1 | 8/2009 | Kistner et al. | |
| 2010/0050614 A1 * | 3/2010 | Parmentier | F01N 3/208 60/287 |
| 2010/0180576 A1 | 7/2010 | Wang et al. | |
| 2011/0218771 A1 | 9/2011 | Seigel | |
| 2011/0219747 A1 * | 9/2011 | Geveci | F01N 3/208 60/274 |
| 2013/0000278 A1 * | 1/2013 | Dubkov | F01N 3/208 60/274 |
| 2013/0008149 A1 | 1/2013 | Ukropec et al. | |
| 2013/0014575 A1 | 1/2013 | Levijoki et al. | |
| 2015/0040543 A1 * | 2/2015 | Shetney | B01D 53/9495 60/301 |
| 2015/0247435 A1 * | 9/2015 | Garimella | F01N 3/208 60/274 |

OTHER PUBLICATIONS

International Search Report and Written Opinion issued for PCT/US2014/062568, dated Apr. 3, 2015, 10 pages.
First office Action issued for Chinese Patent Application No. 201480082786.4, dated Nov. 21, 2018, 5 pages.

* cited by examiner

SCR CONVERSION EFFICIENCY DIAGNOSTICS

CROSS-REFERENCE TO RELATED APPLICATIONS

The present application is a National Stage of PCT Application No. PCT/US2014/062568, filed Oct. 28, 2014, which is hereby incorporated by reference in its entirety.

TECHNICAL FIELD

The present application relates generally to the field of selective catalytic reduction (SCR) systems for an exhaust aftertreatment system.

BACKGROUND

Emissions systems for compression-ignition (e.g., diesel) engines typically monitor the release of carbon monoxide (CO), unburned hydrocarbons (UHC), diesel particulate matter (PM) such as ash and soot, and nitrogen oxides ($NO_x$).

With regard to reducing $NO_x$ emissions, $NO_x$ reduction catalysts, including selective catalytic reduction (SCR) systems, are utilized by exhaust aftertreatment systems to convert $NO_x$ (NO and $NO_2$ in some fraction) to $N_2$ and other compounds. SCR systems utilize a reductant, typically ammonia, to reduce the $NO_x$. Currently available SCR systems can produce high $NO_x$ conversion rates, allowing the combustion technologies to focus on power and efficiency.

SCR systems utilize a reductant delivery system to introduce a reductant into the exhaust stream upstream of the SCR catalyst. When the proper amount of reductant is available at the SCR catalyst under the conditions, the reductant is utilized to reduce $NO_x$. However, if the reduction reaction rate is too slow, or if a deficient amount of reductant is introduced into the exhaust stream upstream of the SCR catalyst, the SCR system may be unable to convert enough $NO_x$.

On-board diagnostics requirements, stipulated by the U.S. Environmental Protection Agency and the California Air Resources Board, require exhaust aftertreatment systems to be monitored on-board and inadequate performance be signaled to the vehicle operator. SCR conversion efficiency is one of the most challenging diagnostics because typical NOx sensors used for control and diagnostics are cross-sensitive to ammonia, which also leads to high warranty costs. The warranty costs generally pertain to false faults, fault isolation, and improper control of urea injection. Other on-board diagnostics are falsely triggered due to the inability of existing diagnostic techniques to adequately address SCR aging. In addition to these issues, measuring or estimating ammonia storage in the SCR catalyst is very difficult.

SUMMARY

A system for determining a performance status of an exhaust aftertreatment system having a first sensor and a controller. The controller is configured to determine an ammonia-to-nitrogen ratio using a sample ammonia input value and a sample NO), input value; The controller is configured to receive an actual $NO_x$ input value and an actual ammonia input value. The first sensor receives an emission value. The controller is further configured to determine a $NO_x$ emission estimate, an ammonia slip estimate, and an optimal ammonia storage value for a selective catalytic reduction using an iterative inefficiency calculation based, at least in part, on the actual $NO_x$ input value, the actual ammonia input value, and the ammonia-to-nitrogen ratio. The controller may also be configured to output the $NO_x$ emission estimate, the ammonia slip estimate, and the optimal ammonia storage value to a remote diagnostic system.

Another implementation relates to a computerized method for determining a performance status of an exhaust aftertreatment system comprising a first sensor and a controller. An ammonia-to-nitrogen ratio using a sample ammonia input value and a sample $NO_x$ input value is determined. An actual $NO_x$ input value and an actual ammonia input value are received. An emission value from the first sensor is received. A $NO_x$ emission estimate, an ammonia slip estimate, and an optimal ammonia storage value for a selective catalytic reduction are determined using an iterative inefficiency calculation based, at least in part, on the actual $NO_x$ input value, the actual ammonia input value, and the ammonia-to-nitrogen ratio. The $NO_x$ emission estimate, the ammonia slip estimate, and the optimal ammonia storage value are output to a remote diagnostic system.

Another implementation relates to an apparatus for determining a performance status of an exhaust aftertreatment system. The apparatus includes a sample performance module structured to determine an ammonia-to-nitrogen ratio using a sample ammonia input value and a sample $NO_x$ input value. The apparatus further includes an pretreatment sensing module structured to receive an actual $NO_x$ input value and an actual ammonia input value. The apparatus further including an aftertreatment sensing module structured to receive an emission value from the first sensor. The apparatus still further includes a selective catalytic reduction estimation module structured to determine a $NO_x$ emission estimate, an ammonia slip estimate, and an optimal ammonia storage value for a selective catalytic reduction using an iterative inefficiency calculation based, at least in part, on the actual NO), input value, the actual ammonia input value, and the ammonia-to-nitrogen ratio. The apparatus further still includes an efficiency diagnostic module structured to output the $NO_x$ emission estimate, the ammonia slip estimate, and the optimal ammonia storage value to a remote diagnostic system.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

As described briefly above, internal combustion engines, such as compression ignited engines (e.g., diesel engines) emit exhaust gas as a product of the combustion reaction. The exhaust gas contains compounds that can be harmful to the environment. Accordingly, exhaust gas aftertreatment systems are often employed to convert pollutants into less harmful compounds, thereby reducing the overall negative environmental impact of the exhaust gas. While conventional exhaust gas aftertreatment systems may include various components, one specific emissions unit for reducing the $NO_x$ content in an exhaust gas stream is an SCR component.

SCR components utilize a diesel exhaust fluid (DEF) (e.g., ammonia) as a reagent to reduce the $NO_x$ in the exhaust gas stream. DEF may include a mixture of urea and deionized water. For example, the DEF source may comprise 32.5% urea and 67.5% deionized water. When the proper amount of ammonia is present in the exhaust gas stream at the SCR catalyst, the ammonia is consumed (oxidized) in the reaction and the $NO_x$ is reduced. In one embodiment, multiple SCR components may be used at different upstream/downstream positions in the aftertreatment system. In another embodiment, a single SCR component may include multiple catalyst beds. The SCR component may also include an SCR catalyst bed that, for example, may be a vanadium-based catalyst and, in other implementations, the SCR component may have a zeolite-based catalyst, such as a Cu-Zeolite or a Fe-Zeolite catalyst. SCR components also generally include a reductant delivery system upstream of the upstream SCR catalyst. The reductant delivery system is operable to inject or dose a reductant into the exhaust gas prior to the gas entering the SCR catalyst bed. In the SCR process, the NOx compounds and ammonia are adsorbed onto the surface of the catalyst where they react to form N2 (reduced $NO_x$) and $H_2O$ (oxidized ammonia).

The systems, methods, and apparatuses described herein utilize models derived from experimental data to derive accurate $NO_x$ and $NH_3$ slip estimates and $NH_3$ storage levels within the SCR catalyst. The embodiments account for $NO_x$ sensor cross-sensitivity to ammonia and eliminate the need for a $NH_3$ sensor for products that have one without sacrificing performance of the aftertreatment system.

Figure 1:
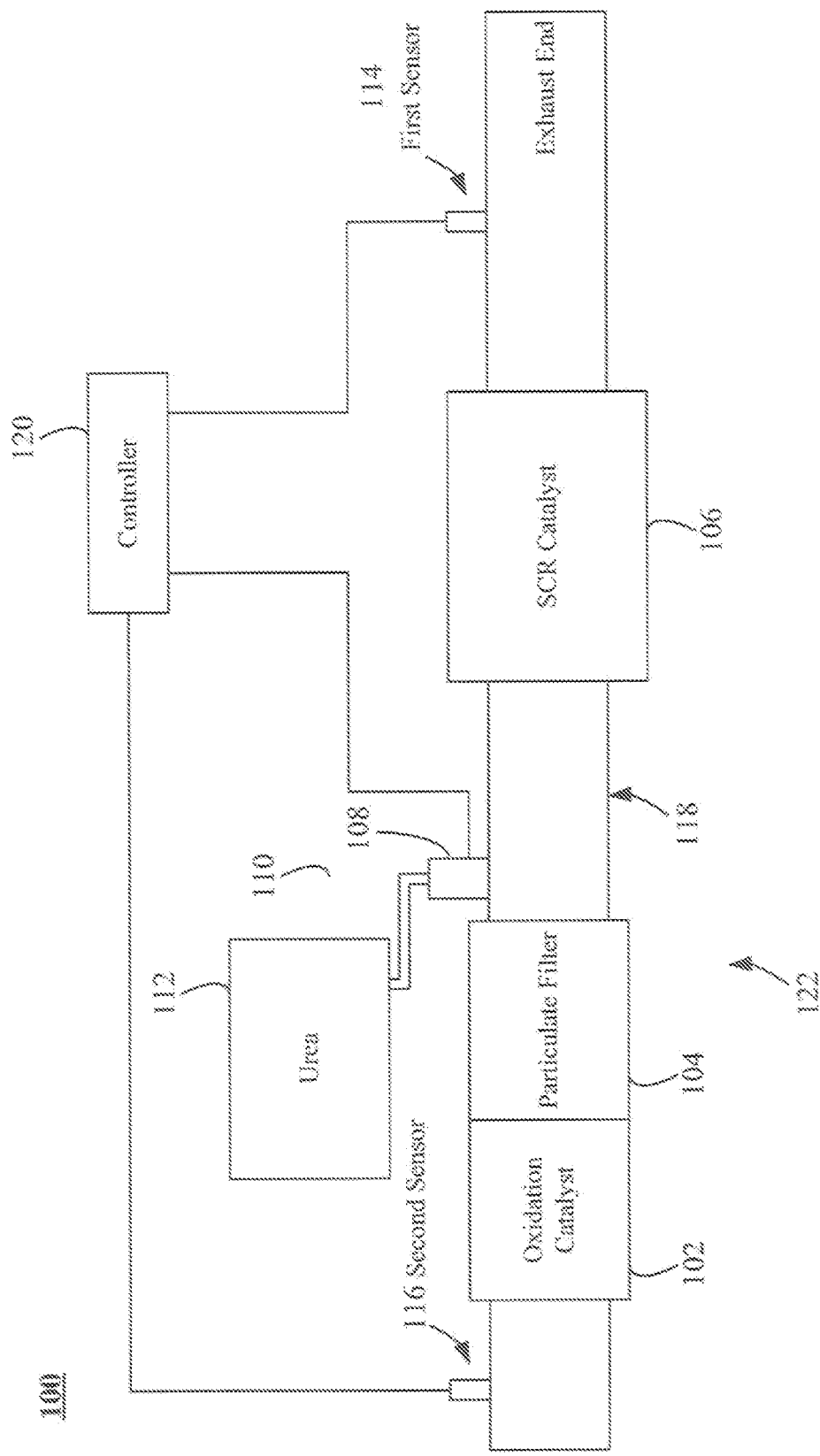
FIG. 1 is a schematic block diagram of an aftertreatment system according to one implementation.

FIG. 1 is a schematic block diagram of an exemplary aftertreatment system according to one implementation. The aftertreatment system 100 comprises an oxidation catalyst 102, a particulate filter 104, a SCR catalyst 106, and a reductant delivery system 110. The particulate filter 104 is configured to remove particulate matter, such as soot, from exhaust gas flowing in the exhaust system 100. The particulate filter 104 includes an inlet, where the exhaust gas is received, and an outlet, where the exhaust gas exits after having particulate matter substantially filtered from the exhaust gas and/or converting the particulate matter into carbon dioxide.

Within the exhaust chamber 118 the reductant, such as urea, aqueous ammonia, or diesel exhaust fluid (DEF) is converted into ammonia, $NH_3$. The chamber is fed by the reductant delivery system 110 by a dosing module 108 configured to dose the reductant into the exhaust chamber 104. In some implementations, the urea, aqueous ammonia, DEF is injected upstream of the SCR catalyst 106. The reductant droplets then undergo the processes of evaporation, thermolysis, and hydrolysis to form gaseous ammonia within the exhaust chamber 118. The exhaust chamber 118 includes an inlet in fluid communication with the particulate filter 104 to receive the exhaust gas containing $NO_x$ emissions and an outlet for the exhaust gas, $NO_x$ emissions, ammonia, and/or remaining reductant to flow to the SCR catalyst 106.

The exhaust chamber 118 includes the dosing module 108 mounted to the exhaust chamber 118 such that the dosing module 108 may dose a reductant, such as urea, aqueous ammonia, or DEF, into the exhaust gases flowing in the exhaust system 190. The dosing module 112 is fluidly coupled to one or more reductant sources 108. In some implementations, a pump (not shown) may be used to pressurize the reductant source 108 for delivery to the dosing module 108.

The dosing module 108 is also electrically or communicatively coupled to a controller 120. The controller 120 is configured to control the dosing module 108 to dose reductant into the exhaust chamber 118. The first sensor 114 and the second sensor 116 are also electrically or communicatively coupled to the controller 120. The controller 120 is configured to receive $NO_x$ and $NH_3$ measurements at the corresponding sensor positions within the exhaust system 122. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the exhaust chamber 118 from which exhaust gas and reductant is received and an outlet in fluid communication with an exhaust end of the exhaust system 122.

The aftertreatment system 100 also includes a first sensor 114 and may include a second sensor 116. The first sensor 114 may be coupled to the exhaust system 122 to detect a condition of the exhaust gas exiting the exhaust system 122 at the exhaust end, downstream of the SCR catalyst 106. In some implementations, the first sensor 114 may have a portion disposed within the exhaust system 122, such as a tip of the first sensor 114 may extend into a portion of the exhaust system 122. In other implementations, the first sensor 114 may receive exhaust gas through another conduit, such as a sample pipe extending from the exhaust system 122. A second sensor 116 may be upstream of the SCR catalyst 106. Additional sensors may be utilized in addition to the first sensor 114 and the second sensor 116 for detecting a condition of the exhaust gas, such as two, three, four, five, six, etc. sensors with each sensor located at a different position of the exhaust system 122.

Figure 2:
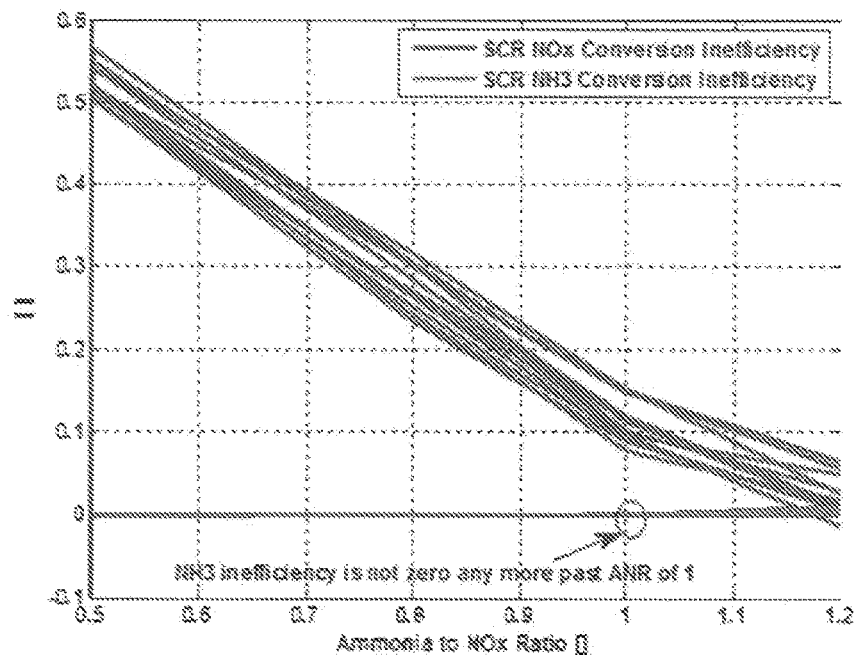
FIG. 2 is a graph illustrating experimental data for $NH_3$ and $NO_x$ Conversion inefficiencies according to one implementation.

FIG. 2 is a graph illustrating experimental data for $NH_3$ and $NO_x$ Conversion inefficiencies according to one implementation. With respect to this graph and the related models and equations derived therefrom, the following terms apply: $NO_x$ Inefficiency of the SCR is Defined by:

$$K_1 = No_x \text{ slip out of the SCR/}NO_x \text{ flowing into the SCR.} \quad (1)$$

$NH_3$ Inefficiency of the SCR is Defined by:

$$K_2 = NH_3 \text{ slip out of the SCR/}NH_3 \text{ flowing into the SCR.} \quad (2)$$

Ammonia-to-Nitrogen Ratio (ANR) of the SCR is Defined by:

$$NH_3 \text{ flowing into the SCR/}NO_x \text{ flowing into the SCR.} \quad (3)$$

Figure 3:
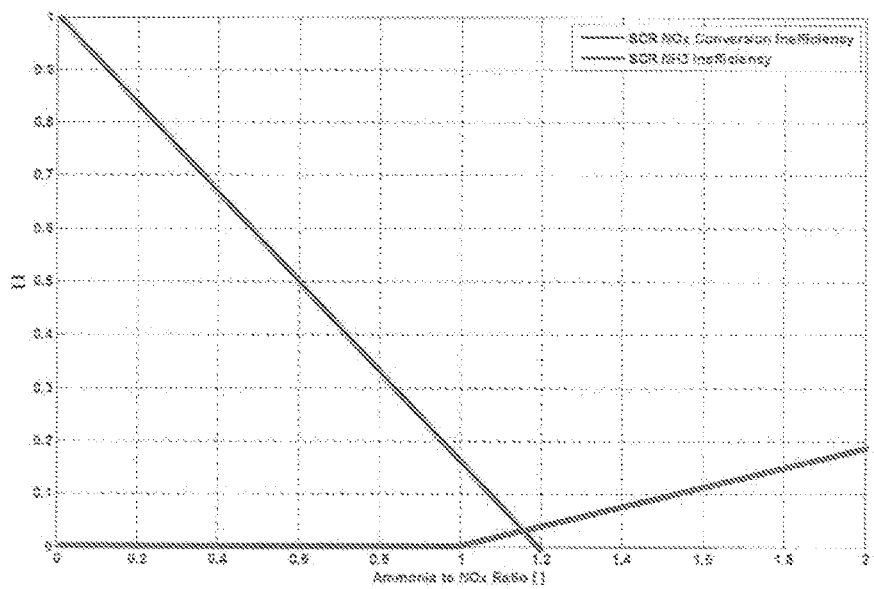
FIG. 3 is a graph illustrating $NO_x$ and $NH_3$ conversion inefficiencies based on the experimental data of FIG. 2.

Thus, FIG. 2 shows experimental steady state data for $NO_x$ and $NH_3$ inefficiencies as plotted versus ANR under various engine speeds and loads. The $NH_3$ storage is not constant during the particular experiment, which partially explains why the lines representing the $NO_x$ inefficiency are not overlapping. This also partially explains why the lines representing $NH_3$ inefficiency are not overlapping. As noted in the figure, $NH_3$ inefficiency is not zero past an ANR of 1. FIG. 3 is a graph illustrating $NO_x$ and $NH_3$ conversion inefficiencies of the SCR based on the experimental data of FIG. 2, representing $NO_x$ and $NH_3$ inefficiencies as a function of ammonia to $NO_x$ ratio and for a constant $NH_3$ storage in accordance with one implementation.

Figure 4:
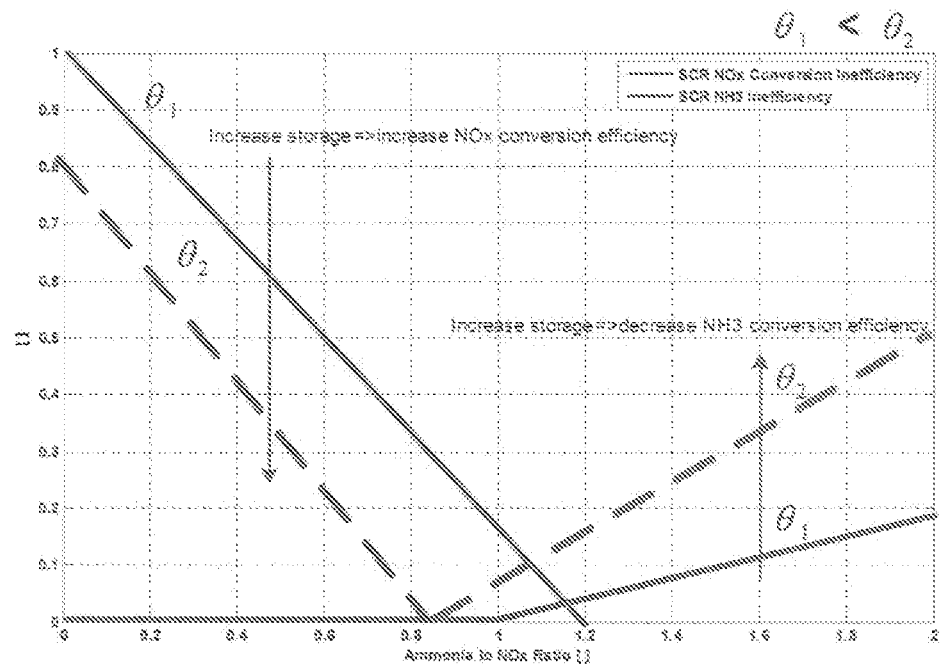
FIG. 4 is a graph illustrating the change in the $NO_x$ and $NH_3$ conversion inefficiencies of the SCR as a function of $NH_3$ storage according to one implementation.

FIG. 4 is a graph illustrating the change in the NOx and $NH_3$ conversion inefficiencies of the SCR as a function of NH3 storage according to one implementation. Using the model of FIG. 3, FIG. 4 describes the $NO_x$ and $NH_3$ conversion inefficiencies for different $NH_3$ storages, where ammonia storage is represented by θ, and represents a value from 0 to 1. An ammonia storage value of 1 represents full storage. As $NH_3$ storage increases there is an associated increase in $NO_x$ conversion efficiency. But as $NH_3$ storage increases, there is also an associated decrease in $NH_3$ conversion efficiency. Thus, the model for $NO_x$ and $NH_3$ conversion inefficiency is as follows:
Model for $NO_x$ Conversion Inefficiency:

$$K_1 = f_1(\theta, ANR) \quad (4)$$

Model for $NH_3$ Conversion Inefficiency:

$$K_2 = f_2(\theta, ANR) \quad (5)$$

Assuming that $f_1$ is linear for values of K; >0, one simplification of the $K_1$ equation can be as follows:

$$K_1 = K_{1\_slope}(\theta) \cdot ANR + K_1(ANR=0) \quad (6)$$

Figure 5:
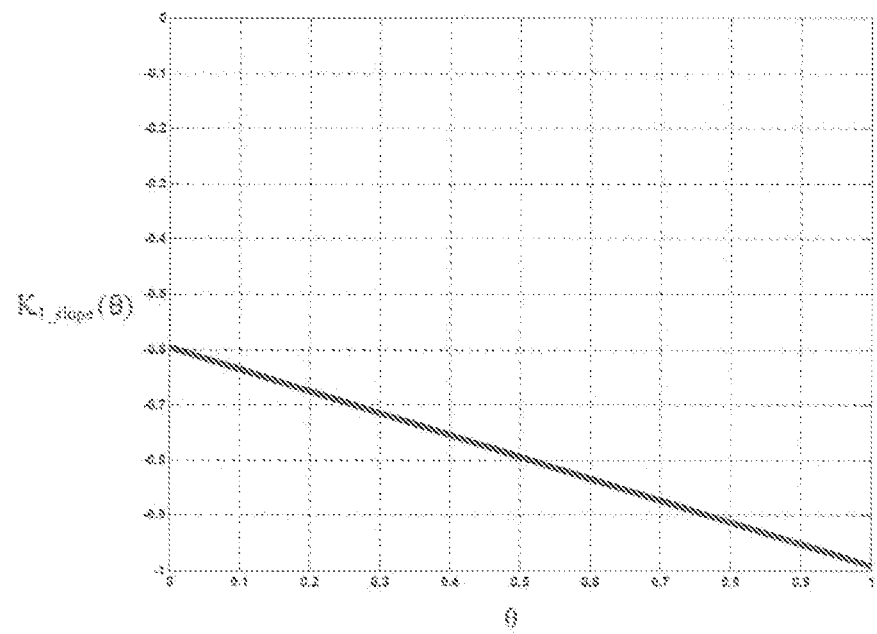
FIG. 5 is a graph illustrating $K_{1\_slope}$ as a function of ammonia storage according to one implementation.

Thus, using the simplified $K_1$ equation, $K_{1\_slope}$ can be determined experimentally. FIG. 5 is a graph illustrating $K_{1\_slope}$ as a function of ammonia storage according to one implementation. And similarly, assuming that $f_2$ is linear for values $K_2 > 0$, one simplification of the $K_2$ equation can be as follows:

$$K_2 = K_{2\_slope}(\theta) \cdot ANR + K_2(ANR=0) \quad (7)$$

The simplified $K_2$ equation can be used to define $K_{2\_slope}(\theta)$ as:

$$K_{2\_slope}(\theta) = a \cdot \tan(\theta/b) \quad (8)$$

and $$K_2(ANR=0) = c \cdot \tan(\theta/b) \quad (9)$$

Where a, b, and c are constants that can be obtained experimentally.

Figure 6:
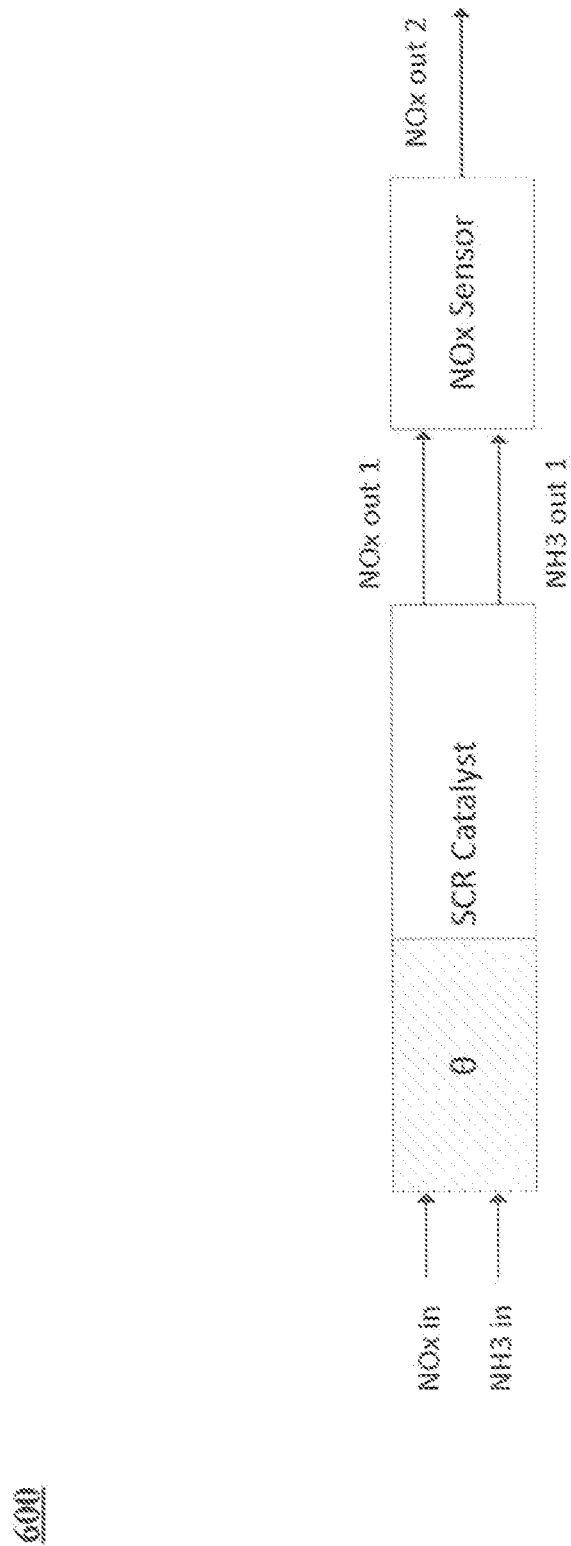
FIG. 6 is a schematic block diagram of an SCR catalyst and $NO_x$ sensor depicting the separate components for $NO_x$ and $NH_3$ estimation purposes according to one implementation.

FIG. 6 is a schematic block diagram of an SCR catalyst and $NO_x$ sensor depicting the separate components for $NO_x$ and $NH_3$ estimation purposes according to one implementation. To alleviate cross-sensitivity of the $NO_x$ sensor to $NO_x$ and $NH_3$, the system may be separated into two components, the SCR catalyst and the NO), sensor. In doing so, the previously described equations can be used to estimate $NO_x$ and $NH_3$ output from the SCR using a measured $NO_x$ output from the end of the exhaust system 122. Referring again to FIG. 6, $NO_x$ in is the engine out $NO_x$ in ppm, which may be measured, for example by the second sensor 116. $NH_3$ in is the amount of $NH_3$ flowing into the SCR in ppm, which can be measured, for example by the second sensor 116. $NO_x$ out 1 is the amount of $NO_x$ not converted by the SCR (the $NO_x$ slip). $NH_3$ out 1 is the amount of $NH_3$ not converted by the SCR (the $NH_3$ slip). And $NO_x$ out 2 is the measurement provided by the $NO_x$ sensor (the first sensor 114). Thus, the following equation can be used in combination with the previously described equations to account for the cross-sensitivity of the sensor:

$$NO_x \text{ out } 2 = NO_x \text{ out } 1 + NH_3 \text{ out } 1 \quad (10)$$

Referring again to FIG. 1, the aftertreatment system 100 may include a controller 120 structured to perform certain operations to determine an ammonia-to-nitrogen ratio (ANR) using a sample ammonia input value and a sample NOx input value. The sample ammonia input value and sample $NO_x$ input value may be measured by the second sensor 116 over time or estimated. An example calculation for determining the ammonia-to-nitrogen ratio (ANR) is as follows:

$$ANR = \frac{\sum_{i=1}^{n} NH_3 in}{\sum_{i=1}^{n} NO_x in} \quad (11)$$

The controller 120 is further structured to receive an actual $NO_x$ input value ($NO_x$ in) and an actual ammonia input value ($NH_3$ in). These values may be received from the second sensor 116. The controller 120 is further structured to receive an emission value ($NO_x$ out 2) from the first sensor 114 and determine a $NO_x$ slip estimate (NO out 1), an ammonia slip estimate ($NH_3$ out 1), and an optimal ammonia storage value (θ) for a selective catalytic reduction using an iterative inefficiency calculation based, at least in part, on the actual NO), input value ($NO_x$ in), the actual ammonia input value ($NH_3$ in), and the ammonia-to-nitrogen ratio (ANR). The controller 120 is further structured to output the $NO_x$ emission estimate (NO out 1), the ammonia slip estimate ($NH_3$ out 1), and the optimal ammonia storage value (θ) to a remote diagnostic system. The remote diagnostic system may be separate from the vehicle or engine system within which the exhaust system is a part, separate from the exhaust system but a part of the vehicle or engine system within which the exhaust system is a part, or a separate module within the exhaust system itself. In certain embodiments, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

Figure 7:
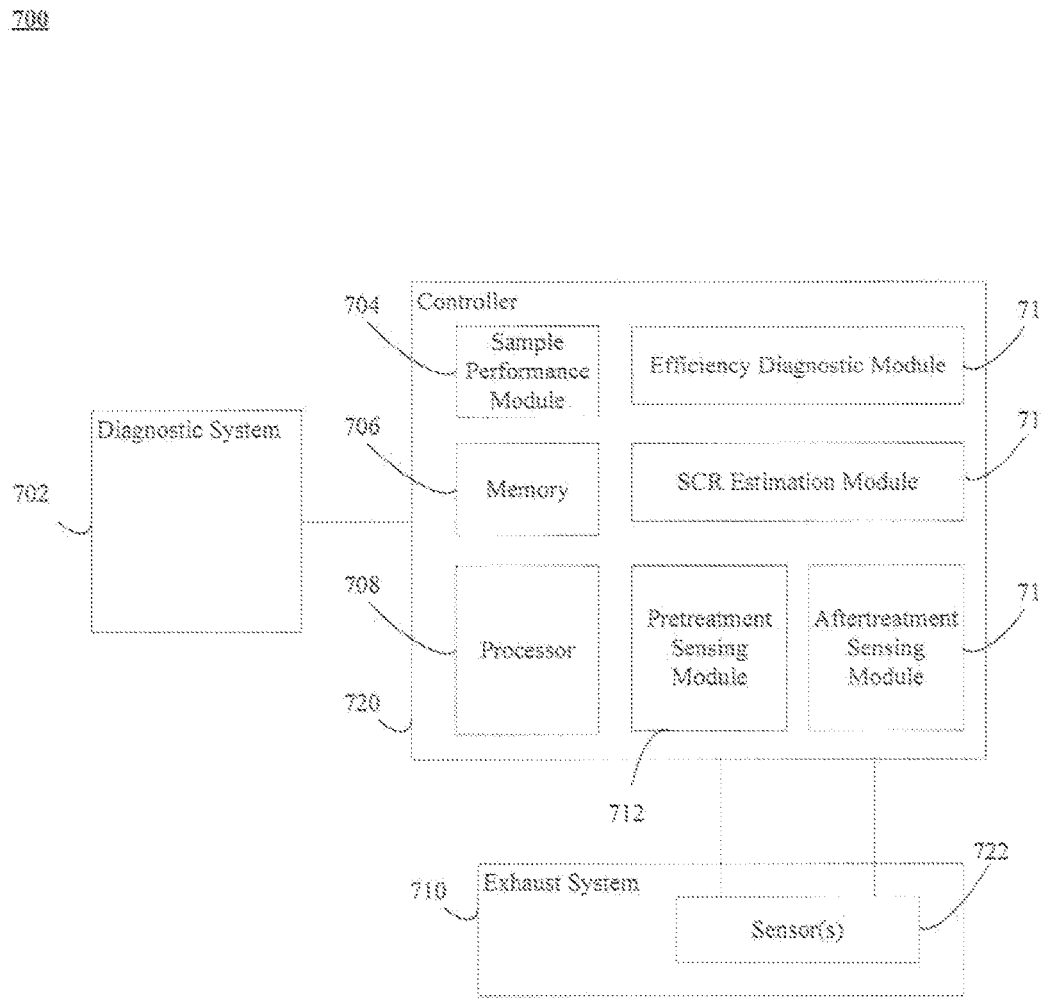
FIG. 7 is a schematic block diagram of a processing subsystem of an aftertreatment system including a controller, according to one implementation.

FIG. 7 is a schematic block diagram of a processing subsystem of an aftertreatment system 700 including a controller 720, according to one implementation. In certain embodiments, the controller includes one or more modules structured to functionally execute the operations of the controller 720. In certain embodiments, the controller 720 includes a sample performance module 704, a pretreatment sensing module 712, an aftertreatment sensing module 718, an efficiency diagnostic module 714, and an SCR estimation module 716. The description herein including modules emphasizes the structural independence of the aspects of the controller 720, and illustrates one grouping of operations and responsibilities of the controller 720. Other groupings that execute similar overall operations are understood within the scope of the present application. Modules may be implemented in hardware and/or as computer instructions on a non-transient computer readable storage medium, and modules may be distributed across various hardware or computer based components. It should also be understood that the individual modules described herein could be part of a controller 720 that is separate or distinct from an engine control module (ECM), or other circuitry within the broader system, or the modules could be included on the same controller that comprises the ECM or other circuitry.

Example and nonlimiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 8:
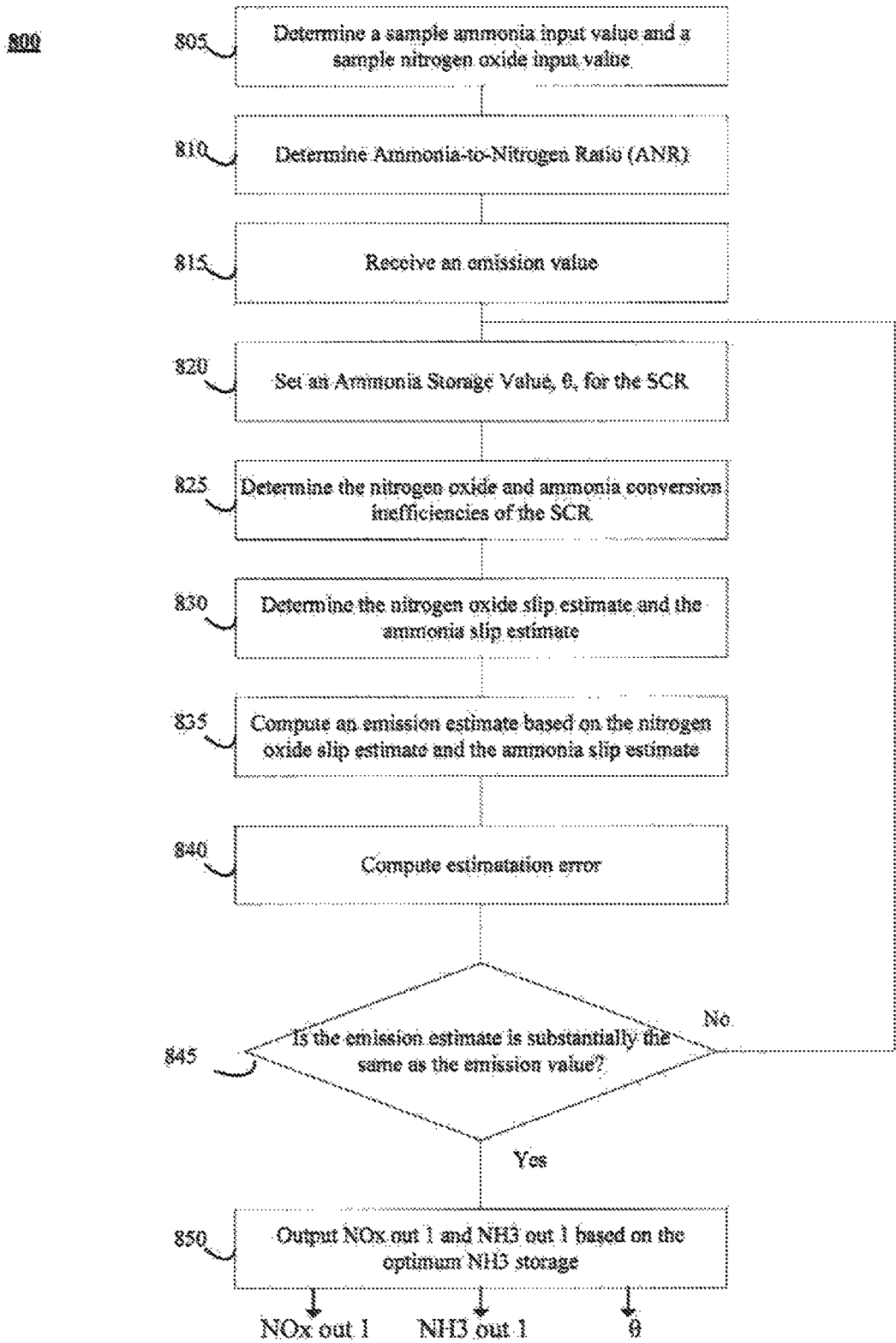
FIG. 8 is a flow chart diagram describing an exemplary process of estimating $NO_x$ and $NH_3$ slip based, at least in part, on an ammonia-to-nitrogen ratio and an estimated ammonia storage.

FIG. 8 is a flow chart diagram describing a process of estimating $NO_x$ and $NH_3$ slip based, at least in part, on an ammonia-to-nitrogen ratio and an estimated ammonia storage according to one implementation. In the process, an actual $NO_x$ input value ($NO_x$ in) and an actual ammonia input value ($NH_3$ in) are received (805). An ammonia-to-nitrogen ratio (ANR) is determined using a sample ammonia input value and a sample $NO_x$ input value (810). The ANR value can be determined according to equation (3). An emission value ($NO_x$ out 2) is received (815). An optimization solver (which may be a for loop) may be used to find the ammonia storage value, θ. Thus, an initial ammonia storage value θ is set for the SCR conversion (820). The $NO_x$ inefficiency value, $K_1$, and ammonia inefficiency value, $K_2$, are determined (825). The nitrogen slip estimate ($NO_x$ out 1) is determined by multiplying the actual NOx input value ($NO_x$ in) by the $NO_x$ inefficiency value ($K_1$) and the ammonia slip estimate ($NH_3$ out 1) is determined by multiplying the actual ammonia input value ($NH_3$ in) by the ammonia inefficiency value ($K_2$) (830). A total emission estimate ($NO_x$ out 2 estimated) is determined by adding the $NO_x$ slip estimate ($NO_x$ out 1) to the ammonia slip estimate ($NH_3$ out 1) (835). It is then determined whether the total emission estimate ($NO_x$ out 2 estimated) is substantially the same as the emission value ($NO_x$ out 2) (845). In certain embodiments an estimation error may be calculated based on a summation $NO_x$ out value, which may be measured by the first sensor 14 over time (840). This may be determined using an estimation error equation as follows:

$$\text{Estimation error} = NO_x \text{ out 2 estimated} - \sum_{i=1}^{n} NO_{xout} \quad (12)$$

When it is determined that the total emission estimate ($NO_x$ out 2 estimated) is substantially the same as the emission value ($NO_x$ out 2), or the estimation error is low based on a summation $NO_x$ out value, the NOx emission estimate ($NO_x$ out 1), the ammonia slip estimate ($NH_3$ out 1), and the optimal ammonia storage value (θ) are output to a remote diagnostic system (850). If it is determined that the total emission estimate (NO out 2 estimated) is not substantially the same as the emission value ($NO_x$ out 2), or the estimation error is low based on a summation $NO_x$ out value, a new ammonia storage value θ is set and the process is repeated until the estimated and actual emission values are substantially the same or the estimation error is minimal. At that point, the $NO_x$ emission estimate ($NO_x$ out 1), the ammonia slip estimate ($NH_3$ out 1), and the optimal ammonia storage value (θ) are output to a remote diagnostic system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 9A:
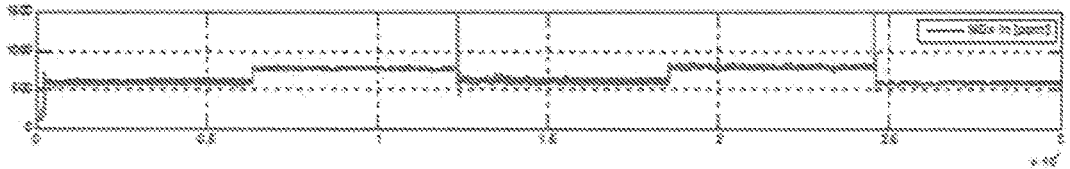
FIGS. 9A-D are graphs illustrating various experimental data for engine out $NO_x$, tailpipe $NO_x$, and ammonia storage.
Figure 9B:
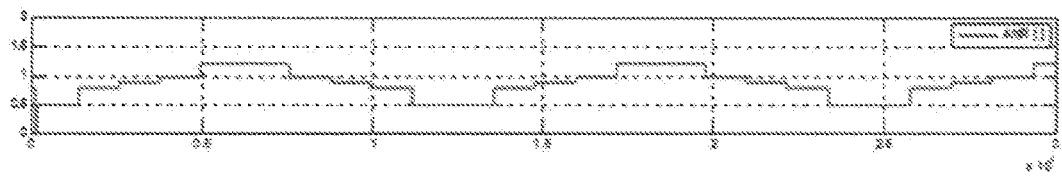
Figure 9C:
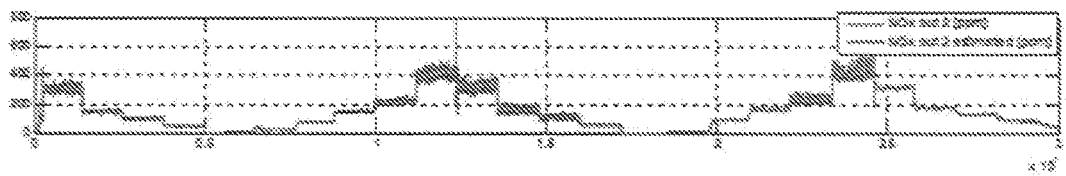
Figure 9D:
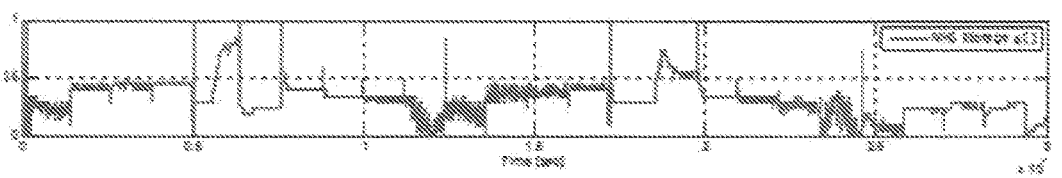

FIGS. 9A-D are graphs illustrating various experimental data for engine out $NO_x$, tailpipe $NO_x$, and ammonia storage, according to one implementation. FIG. 9A is a graph illustrating experimental data for engine out $NO_x$ ($NO_x$ in). FIG. 9B is a chart depicting experimental data for ammonia-to-nitrogen values (ANR). FIG. 9C is a graph illustrating experimental data for the emission value and the total emission estimate ($NO_x$ out 2 and $NO_x$ out 2 estimated, respectively). And FIG. 9D is a graph illustrating experimental data for ammonia storage values (θ). In sum, FIGS. 9A-D shows the capability of the proposed system, method, and apparatus in estimating $NO_x$ at the end of the exhaust system (tailpipe), while correcting for $NH_3$ slip and estimating $NH_3$ storage in the SCR. As mentioned previously, increased estimation accuracy is achieved by accounting for sensor cross-sensitivity to ammonia.

Figure 10:
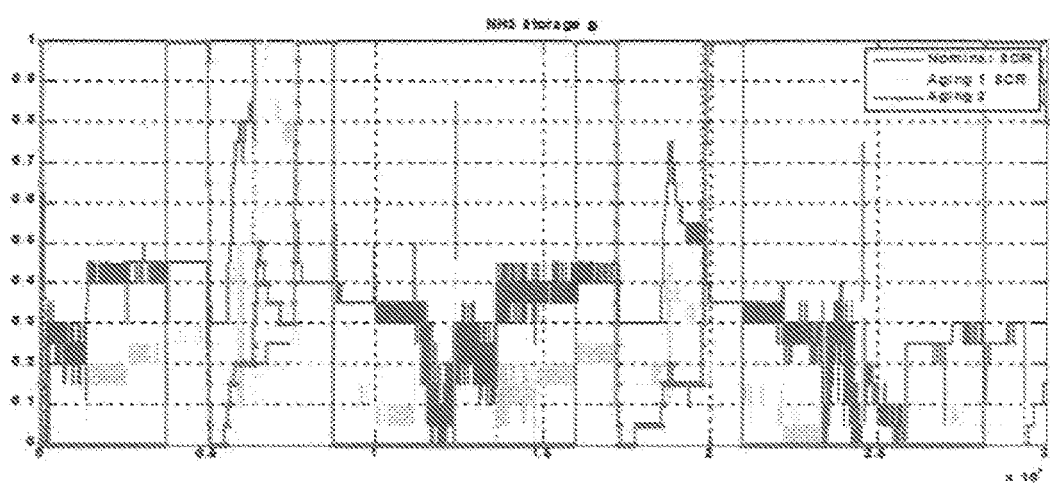
FIG. 10 is a graph illustrating the storage estimation for a nominal SCR, an aged SCR, and a further aged SCR according to one implementation.

FIG. 10 is a graph illustrating the storage estimation for a nominal SCR, an aged SCR, and a further aged SCR according to one implementation. The more deviation of the estimation from a nominal system exists, the more aging the SCR has endured. Furthermore, the storage estimation for a failed SCR will have dominantly zero storage levels, which can be used as a signature to flag a failed SCR that is incapable of converting $NO_x$ and/or $NH_3$.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Reference throughout this specification to features, advantages, or similar language does not imply that all of the features and advantages that may be realized with the subject matter of the present disclosure should be or are in any single implementation. Rather, language referring to the features and advantages is understood to mean that a specific feature, advantage, or characteristic described in connection with an implementation is included in at least one implementation of the present disclosure. Thus, discussion of the features and advantages, and similar language, throughout this specification may, but do not necessarily, refer to the same implementation.

The described features, structures, advantages, and/or characteristics of the subject matter of the present disclosure may be combined in any suitable manner in one or more implementations. In the previous description, numerous specific details are provided to impart a thorough understanding of implementations of the subject matter of the present disclosure. One skilled in the relevant art will recognize that the subject matter of the present disclosure may be practiced without one or more of the specific features, details, components, materials, and/or methods of a particular implementation. In other instances, additional features and advantages may be recognized in certain implementations that may not be present in all implementations. Further, in some instances, well-known structures, materials, or operations are not shown or described in detail to avoid obscuring aspects of the subject matter of the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A system, comprising:
    an exhaust aftertreatment system comprising a first sensor; and
    a controller configured to:
        determine an ammonia-to-nitrogen ratio using a sample ammonia input value and a sample NOx input value;
        receive an actual NOx input value and an actual ammonia input value;
        receive an emission value from the first sensor;
        determine a NOx emission estimate, an ammonia slip estimate, and an optimal ammonia storage value for a selective catalytic reduction using an iterative inefficiency calculation based, at least in part, on the actual NOx input value, the actual ammonia input value, and the ammonia-to-nitrogen ratio; and
        output the NOx emission estimate, the ammonia slip estimate, and the optimal ammonia storage value to a remote diagnostic system.

2. The system of claim 1, wherein the NOx emission estimate, the ammonia slip estimate, and the optimal ammonia storage value for the selective catalytic reduction are determined using an iterative process comprising:
    setting an ammonia storage value for the selective catalytic reduction;
    determining the NOx emission estimate by multiplying the actual NOx input value by a NOx inefficiency value,
    determining the ammonia slip estimate by multiplying the actual ammonia input value by an ammonia inefficiency value,
    computing a total emission estimate by adding the NOx emission estimate to the ammonia output estimate; and
    determining whether the total emission estimate is substantially the same as the emission value.

3. The system of claim 2, wherein the NOx inefficiency value is based, at least in part, on the ammonia storage value and the ammonia-to-nitrogen ratio.

4. The system of claim 2, wherein the ammonia inefficiency value is based, at least in part, on the ammonia storage value and the ammonia-to-nitrogen ratio.

5. The system of claim 2, further comprising, if it is determined that the total emission estimate is not substantially the same as the emission value, causing the controller to set a new ammonia storage value and repeat the iterative inefficiency calculation.

6. The system of claim 2, wherein the $NO_x$ inefficiency value and the ammonia inefficiency value are determined from a predetermined model using the ammonia storage value and the ammonia-to-nitrogen ratio.

7. The system of claim 1, wherein the $NO_x$ input value and the ammonia input value and are determined based on a plurality of actual ammonia input values and a plurality of actual $NO_x$ input values received for a predetermined period of time.

8. The system of claim 7, wherein the plurality of actual ammonia input values and the plurality of actual $NO_x$ input values are received from a second sensor.

9. The system of claim 1, wherein the remote diagnostic system uses the $NO_x$ emission estimate, the ammonia slip estimate, and the optimal ammonia storage value to estimate catalyst aging.

10. The system of claim 1, wherein the diagnostics system is onboard a vehicle.

11. The system of claim 1, wherein the controller is part of the exhaust aftertreatment system.

12. A computerized method for determining a performance status of an exhaust aftertreatment system comprising a first sensor and a controller, the method comprising:
    determining an ammonia-to-nitrogen ratio using a sample ammonia input value and a sample $NO_x$ input value;
    receiving an actual $NO_x$ input value and an actual ammonia input value;
    receiving an emission value from the first sensor;
    determining a $NO_x$ emission estimate, an ammonia slip estimate, and an optimal ammonia storage value for a selective catalytic reduction using an iterative inefficiency calculation based, at least in part, on the actual $NO_x$ input value, the actual ammonia input value, and the ammonia-to-nitrogen ratio; and
    outputting the $NO_x$ emission estimate, the ammonia slip estimate, and the optimal ammonia storage value to a remote diagnostic system.

13. The method of claim 12, wherein the iterative inefficiency calculation comprises:
    setting an ammonia storage value for the selective catalytic reduction;
    determining the $NO_x$ emission estimate by multiplying the actual $NO_x$ input value by a $NO_x$ inefficiency value;
    determining the ammonia slip estimate by multiplying the actual ammonia input value by an ammonia inefficiency value;
    computing a total emission estimate by adding the $NO_x$ emission estimate to the ammonia output estimate; and
    determining whether the total emission estimate is substantially the same as the emission value.

14. The method of claim 13, wherein the $NO_x$ inefficiency value is based, at least in part, on the ammonia storage value and the ammonia-to-nitrogen ratio.

15. The method of claim 13, wherein the ammonia inefficiency value is based, at least in part, on the ammonia storage value and the ammonia-to-nitrogen ratio.

16. The method of claim 13, wherein the iterative process further comprises, if it is determined that the total emission estimate is not substantially the same as the emission value, setting a new ammonia storage value and repeating the iterative inefficiency calculation.

17. The method of claim 13, wherein the $NO_x$ inefficiency value and the ammonia inefficiency value are determined from a predetermined model using the ammonia storage value and the ammonia-to-nitrogen ratio.

18. The method of claim 12, wherein the $NO_x$ input value and the ammonia input value and are determined based on a plurality of actual ammonia input values and a plurality of actual $NO_x$ input values received for a predetermined period of time.

19. The method of claim 18, wherein the plurality of actual ammonia input values and the plurality of actual $NO_x$ input values are received from a second sensor.

20. The method of claim 18, wherein the remote diagnostic system uses the $NO_x$ emission estimate, the ammonia slip estimate, and the optimal ammonia storage value to estimate catalyst aging.

21. The method of claim 18, wherein the diagnostics system is onboard a vehicle.

22. A non-transitory computer-readable medium with computer-readable instructions thereon that, when executed by a controller associated with an exhaust aftertreatment system, cause the controller to:
    determine an ammonia-to-nitrogen ratio using a sample ammonia input value and a sample $NO_x$ input value;
    receive an actual $NO_x$ input value and an actual ammonia input value;
    receive an emission value from a first sensor;
    determine a $NO_x$ emission estimate, an ammonia slip estimate, and an optimal ammonia storage value for a selective catalytic reduction using an iterative inefficiency calculation based, at least in part, on the actual $NO_x$ input value, the actual ammonia input value, and the ammonia-to-nitrogen ratio; and
    output the $NO_x$ emission estimate, the ammonia slip estimate, and the optimal ammonia storage value to a remote diagnostic system.

23. The non-transitory computer readable medium of claim 22, wherein the computer-readable instructions, when executed by the controller, cause the controller to:
    set an ammonia storage value for the selective catalytic reduction;
    determine the $NO_x$ emission estimate by multiplying the actual $NO_x$ input value by a $NO_x$ inefficiency value;
    determine the ammonia slip estimate by multiplying the actual ammonia input value by an ammonia inefficiency value;
    compute a total emission estimate by adding the $NO_x$ emission estimate to the ammonia output estimate; and
    determine whether the total emission estimate is substantially the same as the emission value.

24. The non-transitory computer readable medium of claim 23, wherein the $NO_x$ inefficiency value is based, at least in part, on the ammonia storage value and the ammonia-to-nitrogen ratio.

25. The non-transitory computer readable medium of claim 23, wherein the ammonia inefficiency value is based, at least in part, on the ammonia storage value and the ammonia-to-nitrogen ratio.

26. The non-transitory computer readable medium of claim 23, wherein if it is determined that the total emission estimate is not substantially the same as the emission value, the controller sets a new ammonia storage value and repeats the iterative inefficiency calculation.

27. The non-transitory computer readable medium of claim 23, wherein the $NO_x$ inefficiency value and the ammonia inefficiency value are determined from a predetermined model using the ammonia storage value and the ammonia-to-nitrogen ratio.

28. The non-transitory computer readable medium of claim 22, wherein the $NO_x$ input value and the ammonia input value and are determined based on a plurality of actual ammonia input values and a plurality of actual $NO_x$ input values received for a predetermined period of time.

29. The non-transitory computer readable medium of claim 28, wherein the plurality of actual ammonia input values and the plurality of actual $NO_x$ input values are received from a second sensor.

30. The non-transitory computer readable medium apparatus of claim 22, wherein the remote diagnostic system uses the $NO_x$ emission estimate, the ammonia slip estimate, and the optimal ammonia storage value to estimate catalyst aging.

* * * * *